United States Patent

[11] 3,586,170

| [72] | Inventor | James Sims Reid |
| | | Hudson, Ohio |
| [21] | Appl. No. | 781,141 |
| [22] | Filed | Dec. 4, 1968 |
| [45] | Patented | June 22, 1971 |
| [73] | Assignee | Standard Products Company |
| | | Cleveland, Ohio |

[54] WASTE DISPOSAL SYSTEM AND BOILER
7 Claims, 4 Drawing Figs.

[52] U.S. Cl. .................................................. 210/104,
210/109, 210/152, 210/181, 165/51
[51] Int. Cl. ....................................................... B01d 21/00
[50] Field of Search............................................ 210/152,
181, 251, 104, 109, 187; 165/41, 42, 51, 52

[56] References Cited
UNITED STATES PATENTS

| 1,388,480 | 8/1921 | Paris, Jr. .................... | 55/ET |
| 2,068,395 | 1/1937 | Burckhalter et al. ......... | 210/181 |
| 3,250,263 | 5/1966 | Gerjets ........................ | 55/ET |
| 3,318,449 | 5/1967 | Jennings et al. .............. | 210/104 |
| 3,342,337 | 9/1967 | Reid ............................ | 210/152 |
| 3,464,917 | 9/1969 | Porteous ..................... | 210/181 X |
| 2,894,265 | 7/1959 | Reardon...................... | 165/51 X |
| 3,148,675 | 9/1964 | Menuto ....................... | 16/51 X |
| 3,324,533 | 6/1967 | Watteau...................... | 165/51 X |

*Primary Examiner*—John Adee
*Attorney*—Meyer, Tilberry and Body

ABSTRACT: An improved waste disposal system in which a boiler unit is positioned between the block of an engine and the exhaust manifold with passages in the boiler unit through which the hot gases pass, thereby heating and vaporizing liquid waste material in the boiler.

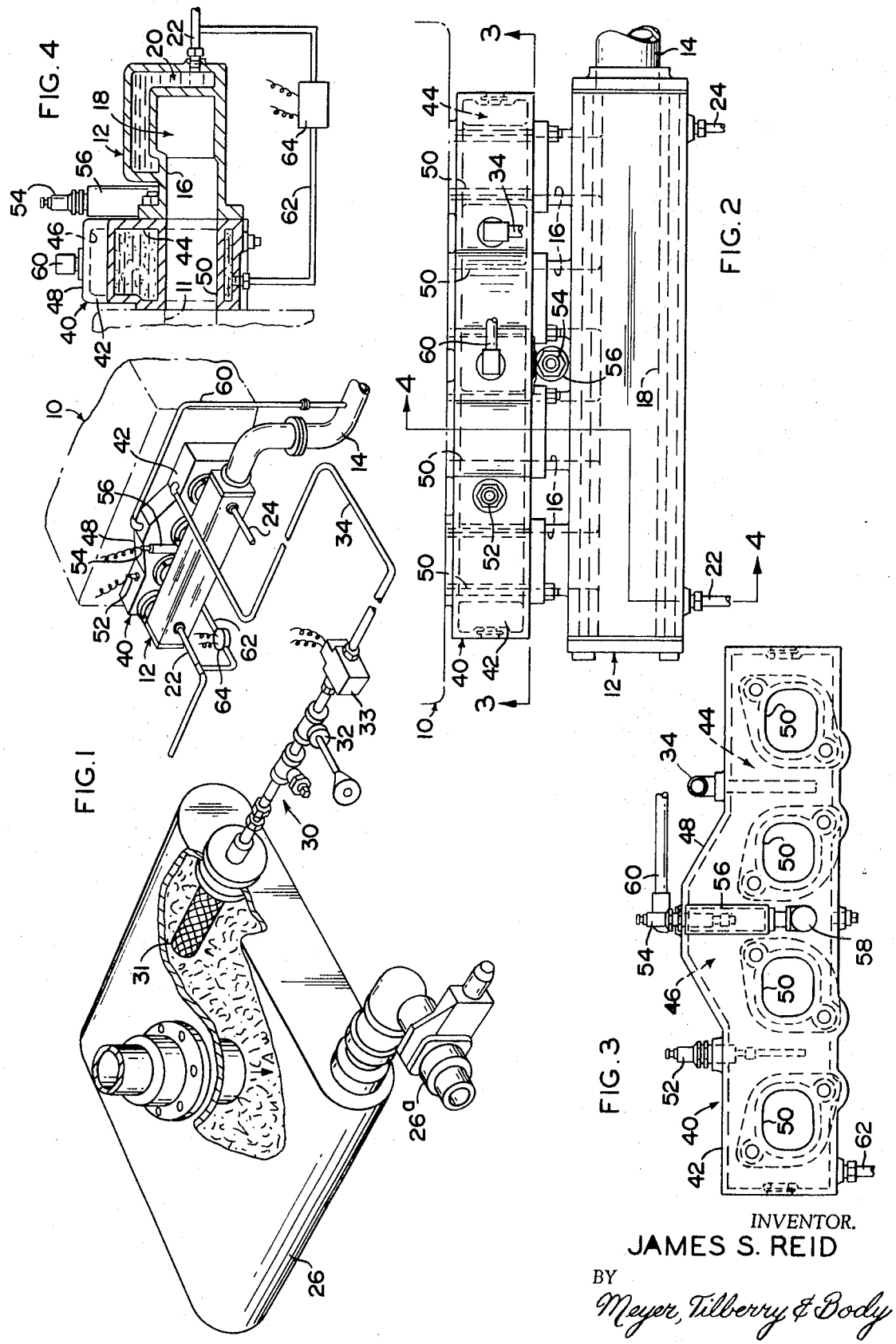

WASTE DISPOSAL SYSTEM AND BOILER

This invention relates generally to improvements in waste disposal systems and, more particularly, to a system specially designed for the disposal of human waste as well as other like disposable waste products.

Although not limited thereto, the waste disposal system of this invention has particular utility in connection with marine engines of the type used in marine craft. The system may also be employed to advantage in other types of vehicular units such as buses, trucks, house trailers, mobile homes and various other classes of vehicles utilized for human transportation. In addition, the waste disposal system of this invention may find utility in domestic housing installations or the like where a conventional sewage system such as those presently in use in most large municipalities is not available.

There is disclosed in my prior U.S. Pat. No. 3,342,337 an improved waste disposal system which is particularly applicable for use with land-type vehicles. The system which is the subject of that prior patent overcomes many of the short comings in the prior art, in that it is operable over extended periods of time without any evidence of accumulation of waste materials which would limit the period of use of the vehicle with which it is associated. Moreover, the waste disposal system disclosed in that patent is completely self-contained so that its operation prevents contaminants from being discharged into the atmosphere and also provides for the disposal of human waste products and/or the like, while the vehicle is in transit.

Although the system disclosed in the aforesaid patent operates entirely satisfactorily when utilized on land-type vehicles, such a unit is not adapted for use with waterborne craft such as power boats. There are several reasons for this, foremost of which is the space limitation imposed on the marine craft and engines associated therewith. Also, the system of my prior patent contemplated that the vehicle would be operated for extended periods of time, thereby permitting the disposal of the collected waste material while the vehicle was in operation. However, marine craft, such as a pleasure boat, normally are operated only intermittently for relatively short periods of time although the boat may be occupied for hours at a time. Accordingly, it is desirable to employ a waste disposal system which can dispose of substantial quantities of waste materials in a relatively short period.

The present invention contemplates a new and improved waste disposal system which eliminates these drawbacks, and provides a system which is readily adapted for use with the existing types of marine engines as well as other types of engines and which is compact in construction but which is efficient in operation.

In accordance with the principles of this invention, there is provided an improved waste disposal system for use with a power source such as an engine which generates waste heated gases and which has an exhaust system including an exhaust manifold and exhaust pipe for disposing of the heated gases. The system contemplates a boiler unit which is positioned between the engine block and the exhaust manifold with the boiler including a chamber in which liquified waste materials may be introduced. Passages in the boiler provide a means by which the heated waste gases of the engine are passed from the engine to the exhaust manifold with the heated gases vaporizing, and thereby purifying, the liquid waste materials in the boiler.

A more specific aspect of the improved system is the use of the boiler unit as an integral part of the exhaust system of the engine thereby to minimize the space required for the waste disposal system and to maximize the efficiency of the disposal system.

Another specific aspect of the system is the use of the liquid waste material as a cooling medium for the boiler in the exhaust system with alternate means provided for cooling the boiler when liquid waste is not being vaporized in the boiler.

It is one of the primary objects of this invention to provide an improved waste disposal system which is applicable for use with marine type vehicles or other vehicles in which limited space is available to accommodate such a system.

A further object of the invention is to provide an improved waste disposal system which utilizes the waste heated gases of the engine before the gases have been discharged into the exhaust manifold and, hence, are at a maximum heated condition.

Still another object of the invention is to provide a compact boiler unit for use in a waste disposal system, which unit when installed becomes an integral part of the exhaust system of the engine with the liquid waste material serving as a cooling medium for the boiler.

Other objects and features of the invention will become more apparent upon a complete reading of the following description which, together with the attached drawings, describes but one preferred embodiment of the invention.

Referring now to the drawings wherein like reference numerals indicate like parts in the various views:

FIG. 1 is a schematic perspective view of the improved waste disposal system installed on an engine.

FIG. 2 is a top plan view illustrating the relationship between the boiler unit of the improved waste disposal system and the exhaust manifold.

FIG. 3 is a sectional view taken along lines 3-3 of FIG. 2.

FIG. 4 is a sectional view taken along line 4-4 of FIG. 2.

Referring now to FIG. 1, the waste disposal system of the present invention is illustrated as adapted for use with a source of power such as an internal combustion engine schematically illustrated at 10. The engine 10 may be of any conventional construction and may be a marine engine or other type of engine suitable for powering a vehicle. Typically, a marine engine includes an exhaust manifold 12 which is normally secured directly to the block of the engine and to which one end of an exhaust pipe 14 is connected. As is conventional, the exhaust manifold 12 includes a plurality of exhaust ports 16 formed in one wall of the manifold with the ports being in communication with the exhaust ports 11 in the block leading from the cylinder chambers. The products of combustion in the engine are discharged into the exhaust manifold chamber 18 and then through the exhaust pipe 14 to the atmosphere. A cooling jacket 20 normally surrounds at least a portion of the manifold chamber 18 and cooling water is circulated through the jacket 20 by an inlet tube 22 and an outlet tube 24.

It will be appreciated that in engines such as a V-8 engine in which there are two banks of cylinders, two exhaust manifolds will be provided with one manifold on either side of the engine block.

As stated, the hot exhaust gases which normally emerge from the engine 10 pass through the exhaust ports 16 into the manifold chamber 18 and then to the exhaust pipe 14 where the gases are discharged. These exhaust gases are normally at very high temperatures as they emerge from the engine 10 and it is these gases which this invention utilizes as the means to vaporize the liquid waste material present in the waste disposal system described hereinafter.

The waste disposal system includes a conventional source of waste products such as a water closet, sink or shower, all of which are a source of waste products which must be disposed of in a sanitary fashion. Typically the disposal of such waste products has been accomplished through the use of a septic tank 26 which is conveniently located, in the case of a vehicle, in a place readily available for cleaning, maintenance and the like. A drain 16a may be provided on the waste tank, preferably adjacent to the bottom thereof, to facilitate cleaning of the tank.

The tank 26 is connected to the source of waste products and is constructed to function as a conventional septic tank whereby, in a manner well known, solid materials are digestively attacked by anaerobic organisms and are thereby turned with the fluid into a partially purified solution. Obviously, various constructions of tanks may be employed without departing from the principles of this invention.

An outlet conduit assembly, indicated generally by the reference numeral 30, is connected at one end of the waste tank 26 and includes a suitable filter 31 which is located inside the tank. The filter 31 defines a liquid level wherein a substantially complete anaerobic process may be performed on the solid waste materials and also functions to prevent the escape of any solids from the tank 26. The outlet conduit assembly may also include a suitable shutoff valve 32 and an inline liquid metering pump 33 of suitable construction.

Connected to the discharge port of the pump 33 is a line 34 which connects the pump with a boiler unit, indicated generally by the reference numeral 40. The boiler unit comprises a housing 42 which may be of any suitable material such as cast aluminum. The housing 42 may be made up either as a single integral unit or may be comprised of a plurality of sectional units which, when assembled form a complete unit. The housing 42 includes a fluid chamber 44 in the interior thereof and a steam chamber 46 which is defined by a raised portion 48 of the housing 42. The housing 42 further includes a plurality of passages 50 which extend transversely through the housing. The passages 50 are equal in number and size to the exhaust ports of the engine with which the boiler unit is to be employed. Thus, if the unit is to be used with a V-8 engine, a pair of boiler units 40 will be used with each unit including four passages 50 which are adapted to cooperate with the exhaust ports associated with each bank of cylinders.

The boiler unit 40 includes a pair of liquid level sensing electrodes on probes 52,54. The probe 52 extends into the liquid chamber 44 to a depth adjacent the bottom of the passages 50. The probe 54 is disposed in a probe housing 56 which is interconnected by a conduit 58 with the liquid chamber in the housing 42. The inner end of the probe 54 is positioned at approximately the level of the juncture between the liquid chamber 44 and the steam chamber 46. Both of these probes are interconnected by appropriate electrical leads to the pump 33. Both probes are of the type commercially available from companies such as B. W. Controller Corporation, Birmingham, Michigan.

An outlet conduit 60 is in communication at one end with the steam chamber 46 and at the other end with the exhaust pipe 14.

The fluid chamber 44 in the boiler 40 is also connected by line 62 with the inlet line 22 leading into the water jacket 20. A control valve 64 is located in the line 62 whereby the liquid chamber 44 may be selectively placed in communication with the line 22 for a purpose hereinafter described.

The boiler unit 40 is employed by assembling it between the exhaust manifold 12 and the block of the engine 10. This is illustrated in FIG. 4 wherein the boiler is secured to the block of the engine where the exhaust manifold is normally located with the exhaust manifold 12 being connected to the boiler instead of directly to the block. As is apparent from FIG. 4, the passages 50 in the boiler 40 are aligned with the exhaust ports 11 in the block and with the exhaust ports 16 leading into the exhaust chamber 18 in the manifold 12. In this manner, the hot exhaust gases passing from the engine cylinders are discharged directly into the passages 50 in the boiler 40 and subsequently into the exhaust manifold where they are discharged to the exhaust pipe.

The above described waste disposal system operates in the following manner. The waste material is deposited in the waste tank 26 where it is converted into a partially purified solution. When the level of liquid waste in the tank has risen to the level of the filter 31 and it is desired to dispose of this liquid material, the fluid is pumped by the pump 33 through the line 34 to the boiler unit 40 where it is deposited in the fluid chamber 44. The operation of the pump 33 is controlled by the probes 52,54. Thus, the pump 33 will be actuated when the level of the liquid in the fluid chamber 44 is below the end of the probe 52 and operation of the pump 33 will be discontinued when the level of liquid in the fluid chamber 44 reaches the end of probe 54. In this manner, flooding of the boiler unit 44 is prevented.

With the engine 10 running, the hot exhaust gases are discharged directly into the passages 50. Because of the elevated temperatures of these exhaust gases, the boiler unit and the liquid disposed therein is raised to a temperature where the liquid commences to vaporize, with the vapors collecting in the steam chamber 46. As the liquid is vaporized, the liquid level in the fluid chamber 44 decreases until it reaches a level where the probe 52 again actuates the pump 33 and the liquid level is brought back up to the level governed by the probe 54. Meanwhile, the vapors collecting in the steam chamber 46 pass out of the boiler unit 40 through the discharge line 60 and are then discharged into the exhaust pipe 14 where it is mixed with the exhaust gases and discharged into the atmosphere. Some of the vapors in the tube 60 may become cooled and revert partially or substantially to a liquid form prior to being discharged into the exhaust pipe 14; however, since both the vapors and the condensed liquid in the tube 60 have been subjected to the elevated temperatures present in the steam chamber 46 they are in a purified condition so that the resultant gases or liquid discharged from the exhaust pipe do not create any health hazards.

It is apparent that the liquid waste material in the liquid chamber 44 acts as a coolant for the boiler unit 40 and prevents the unit from reaching excessive temperatures. However, in the event the level of the liquid in the tank 26 falls below the filter 31, it will be apparent that the pump 33 will be ineffective to supply liquid to the boiler unit 40. In such circumstances, the boiler unit may tend to reach excessive temperatures once the liquid in the chamber 44 has been dissipated. To prevent this, the control valve 64 may then be actuated by appropriate means to place the cooling water inlet 22 in communication with the liquid chamber 44 and thereby supply a cooling liquid to the boiler unit 40. As will be readily understood, the fluid introduced in this manner will be dissipated through vaporization in the same manner as the liquid waste material. Once the liquid in tank 26 has reached a sufficiently high level, the control valve 64 will be operated to discontinue the flow of coolant from line 22 and the pump 33 will again supply liquid waste material to the boiler.

Several advantages of the boiler unit and the waste disposal system described hereinabove should be noted. The boiler unit provides a completely closed chamber into which the liquid waste products may be introduced and vaporized with no portion of the exhaust gases being mixed with the liquid waste material until after purification has been completed. In this manner, problems of corrosion are kept to a minimum. Moreover, because of the positioning of the boiler unit between the exhaust manifold and the block of the engine the boiler unit becomes, in effect, an integral part of the exhaust system and is subjected to very high temperatures which results in a highly effective conversion of the liquid waste material into a purified vaporized form. In addition, the compact construction of the boiler unit itself makes the system particularly well suited for applications in which only a limited space is available.

Having thus described my invention, I claim:

1. An improved waste disposal system for use with a power source such as an internal combustion engine or the like in which waste heated gases are generated and which includes an exhaust system comprising exhaust ports, an exhaust manifold and an exhaust pipe for disposing of said heated gases, said disposal system including a waste tank for receiving waste material and means for vaporizing the liquid material, the improvement comprising:

conduit means connecting said vaporizing means to said tank to receive liquid therefrom and to said exhaust system to discharge vapor thereinto, said vaporizing means being positioned between said engine and said manifold and exposed to the heated gases as the gases pass from the exhaust ports of the engine to the exhaust manifold.

2. The improvement of claim 1 wherein said vaporizing means comprises a boiler unit between said engine and said exhaust manifold, said boiler unit including passage means to permit the flow of heated gases through said unit to the exhaust manifold.

3. The improvement of claim 2 wherein said system further includes means for controlling the level of the liquid in the boiler unit, and pump means responsive to said level controlling means for supplying liquid from the tank to said boiler unit.

4. The improvement of claim 2 wherein said boiler unit comprises a housing defining a fluid chamber therein, said passage means extending through the fluid chamber, and a portion of said housing defining a steam chamber.

5. The improvement of claim 4 and further including liquid level probe means carried by said housing and operative to sense the level of the liquid in the housing.

6. The improvement of claim 3 wherein said level controlling means comprises liquid level sensing probes in said boiler unit.

7. The improvement of claim 4 and further including additional conduit means connecting said boiler unit to a supplementary source of liquid, and means for controlling the supply of supplementary liquid through said additional conduit means.